June 13, 1961 | G. A. OLIVE | 2,988,593

TAPE REPRODUCING SYSTEM

Filed Oct. 1, 1958

2 Sheets-Sheet 1

INVENTOR.
GEORGE A. OLIVE
BY
W. H. Sprague
ATTORNEY

June 13, 1961 G. A. OLIVE 2,988,593

TAPE REPRODUCING SYSTEM

Filed Oct. 1, 1958 2 Sheets-Sheet 2

INVENTOR.
GEORGE A. OLIVE

BY

W. H. Sprague
ATTORNEY

United States Patent Office 2,988,593

Patented June 13, 1961

2,988,593

TAPE REPRODUCING SYSTEM

George A. Olive, Lawrenceville, N.J., assignor to Radio Corporation of America, a corporation of Delaware Filed Oct. 1, 1958, Ser. No. 764,710
12 Claims. (Cl. 178—5.4)

This invention relates to improvements in electrical signal recording systems and more particularly to a system for overcoming the effects of undesired timing variations incident to the reproduction of a color television signal recorded on a movable magnetic storage medium.

Several systems are now known for recording electrical signals on a movable storage medium such as magnetic tape. One such system employs the so-called lateral scan in which the tape is scanned in the direction of its width perpendicular to the direction of the motion to the tape. Another such system employs the so-called longitudinal scan in which signals are recorded in a longitudinal direction on the tape, that is, in the direction of tape motion as the tape is moved in the direction of its length.

Regardless of the system employed, it is quite difficult to obtain accurate recording and reproduction of information. To obtain accurate reproduction of recorded information, the relative motion between those areas on the recording medium containing recorded representations and the transducing means must remain the same during recording as during playback. Due to these variations in the relative speed between the recording and playback which exist in practical systems, the recovered or reproduced signal suffers from distortions or timing variations known as "flutter" (the term applied to the high frequency variation in the relative motion during recording and playback) or "wow" (the low frequency variations). These timing variations show up, when the recorded signal is a television signal, as picture jitter in the conventional television receiver employed to transduce the played back signal.

The velocity of the magnetic tape may be maintained constant by using the phase of the recorded television synchronizing signals or color reference burst as an index of the velocity changes of the tape. In the alternative, a separate control track containing a constant frequency signal may be recorded simultaneously with the information signals. Such system is described in United States Patent No. 2,797,263 issued to Ray M. Dolby. This speed control system has been found very useful in overcoming relatively long term velocity variations in the tape and thus correcting picture jitter to some extent but is relatively insignificant in correcting short term tape velocity variations.

These short term variations cause particular difficulty when color television signals are recorded. The standard color television signal comprises a luminance component and a chrominance component. The luminance component is represented by an electrical signal covering a band of 4 megacycles (mc.) per second and is basically of the same nature as a standard monochrome television signal. The chrominance component, on the other hand, is a phase and amplitude modulated carrier having a nominal frequency of approximately 3.57+ mc. which is an odd multiple of one-half the television line deflection frequency. The phase of this subcarrier is modulated by color hue information and its amplitude is modulated by color saturation information. If the magnitude of these short term timing or phase variations is in excess of 5° of the color subcarrier frequency over a short period of time, objectionable color changes result on the screen of conventional color television receivers employed to transduce such played back signals.

Systems have been proposed to overcome the effect of these tape motion variations by variably delaying the recovered signals by an amount necessary to offset any time or phase variations introduced therein. The variable delay is controlled by using a recovered pilot tone, color burst, or synchronizing component which has been recorded on the tape along with the information signals to control the amount by which the recovered information signals are delayed. The recovered pilot tone or reference component is compared to a standard signal to obtain an error voltage which is proportional to the time error. Such system is much the same as that employed to maintain constant the relative motion during recording and playback. These systems operate quite well but have the disadvantage that if a continuous reference signal or pilot tone is desired, a separate track on the magnetic tape is required. With the use of such separate track, the pilot tone is not directly indicative of the tape motion variations effecting the recorded information due, for example, to tape skew, stretching, warping, etc. An earlier filed application by William D. Houghton, Serial No. 451,666, filed August 23, 1954, entitled "Tape Recording System," and assigned to the same assignee of the subject application proposes, in one form of his invention, to use the sync signal after its passage through a variable delay as the reference signal. As is apparent, this system of using sync does not provide a continuous pilot tone from which continuous control of the correction may be obtained. The correction provided by the Houghton system provides a correction which is precisely accurate only at the beginning of each horizontal line. This system is quite satisfactory since the stability of tape systems is usually adequate to remain substantially constant for this horizontal line duration. However, if the delay of the line provided at the beginning of the horizontal line is, for some reason, in error, this delay remains incorrect for the remainder of that particular line. No means for comparison and correction is provided during the line interval.

To use the burst of a composite color television signal alone as the reference signal or pilot tone, is not completely satisfactory since the error determination, as in the case of using the synchronizing signals for a reference, is made only at the beginning of each horizontal line. Further, the delay of the delay line must be rapidly variable at the beginning of the burst period and yet must have sufficient stability to remain fixed, once it is set, for the duration of the horizontal television line. These two requirements of providing a rapidly variable yet stable delay line are somewhat incompatible.

It is therefore an object of this invention to provide an improved system for overcoming the timing variations introduced in signals by recording and reproducing systems employing movable storage mediums.

Another object of this invention is to provide an improved system for reducing the effects of irregular tape velocity in color television recording systems.

An additional object of the present invention is to provide an improved system for stabilizing the phase of recorded color television signals without limiting the resolution of the information content therein.

A further object of the present invention is to provide an improved system for recovering a recorded color television signal that subjects a continuous reference signal to the same delay to which the color television signal is subjected.

In accordance with one form of the invention, a composite color television signal is recovered from a magnetic tape. Since the color reference burst component of the recovered composite color television signal is distorted by the same timing variations which act upon the composite color television signal, it may be employed as a reference signal to provide an indication of the timing errors in the recovered signal. A burst separator allows the regularly recurring burst component of the color television signal to trigger a burst synchronized oscillator of a type which allows each burst to completely resynchronize the oscillator to produce a continuous 3.57+ mc. pilot tone essentially of the same frequency and phase as the color subcarrier. The composite color television signal is then passed through a phase splitter and the pilot tone added to each phase of the composite signal provided by the phase splitter. Two separate signals are thus produced each including the pilot tone and a composite color signal 180° out of phase with the other. These separate signals are each passed through individual identical variable delay lines whose delay is adjustable by a control signal.

By subtracting the output of the delay lines, the composite color signal is recovered (the pilot tones cancel each other). By adding the outputs of each of the delay lines together, the pilot tone is recovered. The pilot tone is now phase compared with a standard signal derived from a local stable color subcarrier generator. The output of the phase comparator is a control signal that is indicative of the timing errors imparted to the television signal by the recording and reproducing systems. This control signal may be used to vary the delay of each of the delay lines to compensate for the tape jitter and other timing variations imparted to the television signals.

In this manner, the pilot tone is in the frequency band occupied by the color subcarrier but is still separable by the above system. Because it is in the same band as the color subcarrier, a greater degree of correction is obtainable for the color subcarrier than would otherwise be possible. For example, a pilot tone of 4.8 mc. could be used which could be separated from the color television signal by filters. However, the control circuit would make the delay of the delay lines correct at 4.8 mc. but, in practical circuits, the delay determined by the 4.8 mc. signal that is imposed on a 3.57+ mc. signal (where the greatest accuracy is desired) might not be accurate enough. The pilot tone is continuously available to reflect any changes in the characteristic of the delay lines or the control circuits therefor. If any such changes occur, immediate correction during the horizontal television interval is possible.

The novel features of this invention, as well as the invention itself, both as to its organization and method of operation, will best be understood from the following description, when read in connection with the accompanying drawings, in which like reference numerals refer to like parts, in which.

Figure 1:
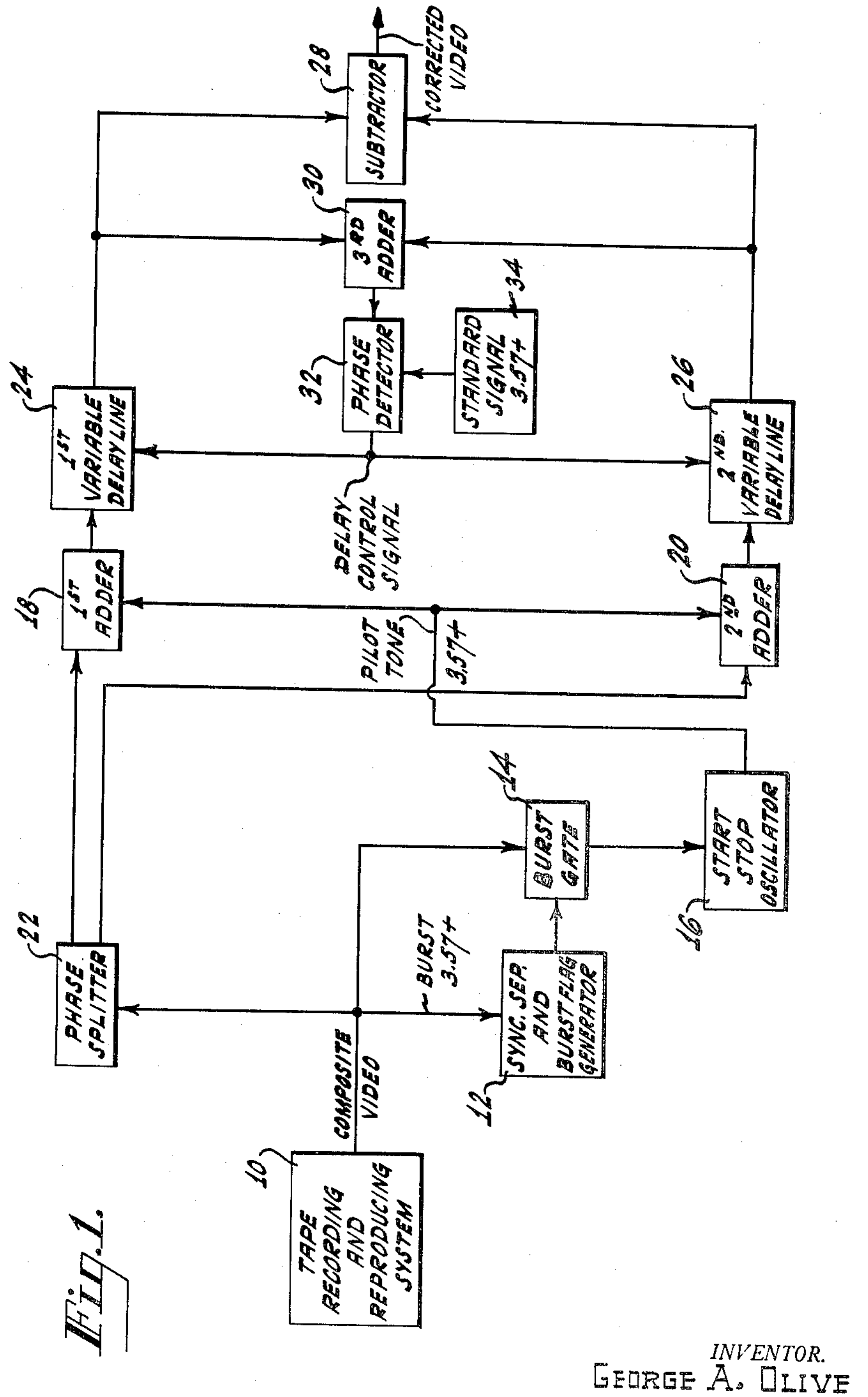
FIGURE 1 is a block diagram of one form of the invention.

Referring to FIGURE 1, there appears a block 10 representing a tape recording and reproducing system. The tape recording and reproducing system may be any of the systems known today capable of recording a wideband signal such as a color television signal. For brevity and clarity of description, the system of FIGURE 1 will be described in an application to the correction of time and phase variations in a recorded composite color television signal. In this instance, the tape recording and reproducing system 10 may be the same as the RCA quadruplex video tape recorder described in the January 1958 issue of Broadcast News published by Radio Corporation of America, Camden, New Jersey. In the alternative, the tape recording and reproducing system 10 may be the Ampex VRX 1000 video tape recorder. Each of these systems employ the so-called lateral scan tape recorder. A longitudinal type scan tape recorder may be employed if desired.

In any event, the output of the tape recording and reproducing system 10 yields a composite video signal which may be distorted by timing or phase variations due to any non-uniform relative movement of the tape system during recording and reproducing. A synchronizing signal (sync) separator and burst flag generator 12 removes the horizontal and vertical synchronizing signals from the composite video signal and generates a pulse known as the burst flag pulse which operates a burst gate 14 to remove the color reference burst occurring during the horizontal blanking intervals. The sync separator may be any of the conventional types employed and known in the television art. The burst flag generator may be the type described in "Color Television Engineering," by John W. Wentworth, McGraw-Hill, page 288.

When actuated by the burst flag pulse, the burst gate 14 allows the color reference burst signal (having a frequency of approximately 3.57+ mc.) to pass to a resynchronizing type oscillator generally referred to as a start-stop oscillator 16. A suitable start-stop oscillator is described in detail in the description of FIGURE 2. The start-stop oscillator 16 provides a continuous pilot tone signal at the frequency of the color sub-carrier which is relatively stable for the duration of at least one horizontal line. With the occurrence of each succeeding color reference burst signal, the phase of the start-stop oscillator 16 is completely reset regardless of its phase during the preceding horizontal line interval to assume the phase established by each successive color reference burst. Thus, the pilot tone produced by the start-stop oscillator 16 provides an indication on a line-by-line basis or the phase of timing errors occurring in the composite video signal and particularly in the color portion of the composite color video signal which requires the most accurate timing. It has been found that the variations occurring during the horizontal line interval due to relative motion variations in the tape recording system are generally of a minor nature.

Thus, in accordance with the invention, this pilot tone which is representative of the timing or phase errors in the composite video signal is applied to each of a first adder 18 and a second adder 20. The composite video signal from the tape recording and reproducing system 10 is passed through a phase splitter 22 which provides phase and paraphase representations of the original composite video signal. One of the outputs of the phase splitter 22, for example that output containing the phase variations of the original composite video signal, is applied to the first adder 18. The remaining output of the phase splitter 22 containing the paraphase signal variations of the original composite video signal then is applied to the second adder 20. The first and second adders 18 and 20, respectively, add the pilot tone from the start-stop oscillator 16 to the respective phase and paraphase representations of the original composite video signal. The outputs of the first and second adders 18 and 20 respectively are coupled to the inputs of first and second variable delay lines 24 and 26, respectively. In this manner, the pilot tone, which is later used to control the delay of the variable delay line to correct for the timing errors appearing in the composite video signal, is subjected to the same influences in the variable delay lines 24 and 26 as is the composite video signal. The outputs of the variable delay lines 24 and 26 respectively are coupled to the inputs of a subtractor circuit 28. The subtractor circuit may, for example, be a conventional differential amplifier of the type described, for example, in vacuum tube amplifiers by Valley and Wallman, volume 18 of the MIT Radiation Laboratory Series, section 11–10.

The subtractor 28 subtracts, for example, the output of the first variable delay line 24 from that of the second variable delay line 26. In this manner the pilot tone signal applied in the same phase to each of the first and second adders 18 and 20 and passed to the first and second variable delay lines 24 and 26 is cancelled. The phase and paraphase representations of the composite video signal on the other hand being applied 180° out of phase to the first and second adders 18 and 20, respectively, thence to the first and second variable delay lines 24 and 26 are effectively added in the subtractor 28 to provide a corrected video signal output free of the pilot tone from the start-stop oscillator 16 and, due to the action of the variable delay lines 24 and 26, free of the timing or phase errors appearing therein resulting from the tape recording and reproducing system 10.

The first and second variable delay lines may be any suitable continuously variable delay line capable of passing a wideband signal. Two such types of delay lines are described in a Patent No. 2,828,478, issued March 25, 1958, to Wayne R. Johnson. Other suitable continuously variable delay lines are described in an application, Serial No. 490,570, filed February 25, 1955, by Edwin A. Goldberg and assigned to the same assignee as the subject application, now Patent No. 2,852,750, issued September 16, 1958. Still another variable delay line is described in Patent No. 2,565,231, issued August 21, 1951, to Gerard Hepp.

In a similar manner, the output of the first and second variable delay lines 24 and 26 is applied to an adder 30 to separate the pilot tone from the composite video signals. The adder 30 may be a conventional circuit comprising two pentode tubes having a common anode resistor. In the adder 30, the composite video signals from the first and second variable delay lines 24 and 26 being 180° out of phase with each other are cancelled. The pilot tone signals, on the other hand, in each of the signals from the first and second variable delay lines 24 and 26 add to produce a pilot tone signal which is applied to a phase detector 32. Thus, the pilot tone is easily separated from the composite video signal. Signals from a standard signal source 34 are also supplied to the phase detector or comparator 32. The standard signal source 34 may be a crystal controlled color reference signal oscillator such as used in television stations to supply the standard color subcarrier frequency of 3.57+ mc. The phase detector 32 compares the phase of the pilot tone from the adder 30 with that of the stable color subcarrier signal from the source 34 and provides an output that varies both in magnitude and polarity dependent upon the relative phase of the pilot tone from the adder 30 with respect to that of the standard signal from the source 34. The output of the phase detector 32 thus constitutes a delay control signal which is employed to simultaneously vary the delay of the first and second variable delay lines 24 and 26 respectively. If, for example, the phase of the pilot tone is ahead of the standard signal phase, indicating the television signal is too early, the delay imparted to the television signal by the delay lines 24 and 26 is increased to compensate therefor. It may, thus, be said that the loop including the adder 30 and the phase detector 32 constitutes a feedback loop for controlling the delay of the respectively variable delay lines 24 and 26.

In this manner, the variable delay lines 24 and 26 are continuously controlled to provide the proper delay to correct timing errors appearing in the composite video signal from the tape recording and reproducing system 10. If any of the circuit parameters of the variable delay lines 24 and 26, the adder 30 or the phase detector 32 vary, an immediate correction for such variation is effected to compensate correctly for the timing errors appearing in the composite video signal.

In prior arrangements wherein the sync or burst was periodically compared to a reference or standard signal, any error or variation in the operating characteristics of the circuit parameters between the recurring signals remained uncorrected until the reoccurrence of the burst sync or other reference signals. Further, in color television systems, the pilot tone employed in accordance with this invention is in the frequency band occupied by the color subcarrier but is still separable therefrom. Since the delays are substantially linear in operation, the pilot tone may be maintained at a low signal level compared to the intelligence signal to prevent modulation errors between the two signals. The low level operation is not possible on tape due to tape noise and nonlinearity. By placing the pilot tone in the same band as the color subcarrier, a greater degree of correction is obtainable for the color subcarrier, which should not have timing variations greater than 5° at the color subcarrier frequency. For example, if a pilot tone of 4.8 mc. was used which could easily be separated by filters, the delay provided for the color subcarrier at 3.57+ mc. where the greatest accuracy is desired might not be accurate enough. The present invention obviates these difficulties.

This invention, is described above for use with a color television signal, but it is apparent to those skilled in that art that the invention has other applications as well. For example, the tape recording and reproducing system 10 could record any type of information signal that includes a reference signal that may be used to determine the timing or phase errors in the reproduced information. The reference signal may be distinguished from the information signal on a time basis as in FIGURE 1, in which case a gate such as the burst gate 14, would be necessary to separate the reference signal from the information signals. In the alternative, the reference signal may be a single pulse, such as a deflection synchronizing pulse, a step wave, or a burst of signals similar to the color reference burst signal. As still another alternative, the reference signal may be a continuous frequency signal recorded on a separate track on the recording medium. In such case the start-stop oscillator is not required. A reactance tube controlled oscillator may be used instead.

Figure 2:
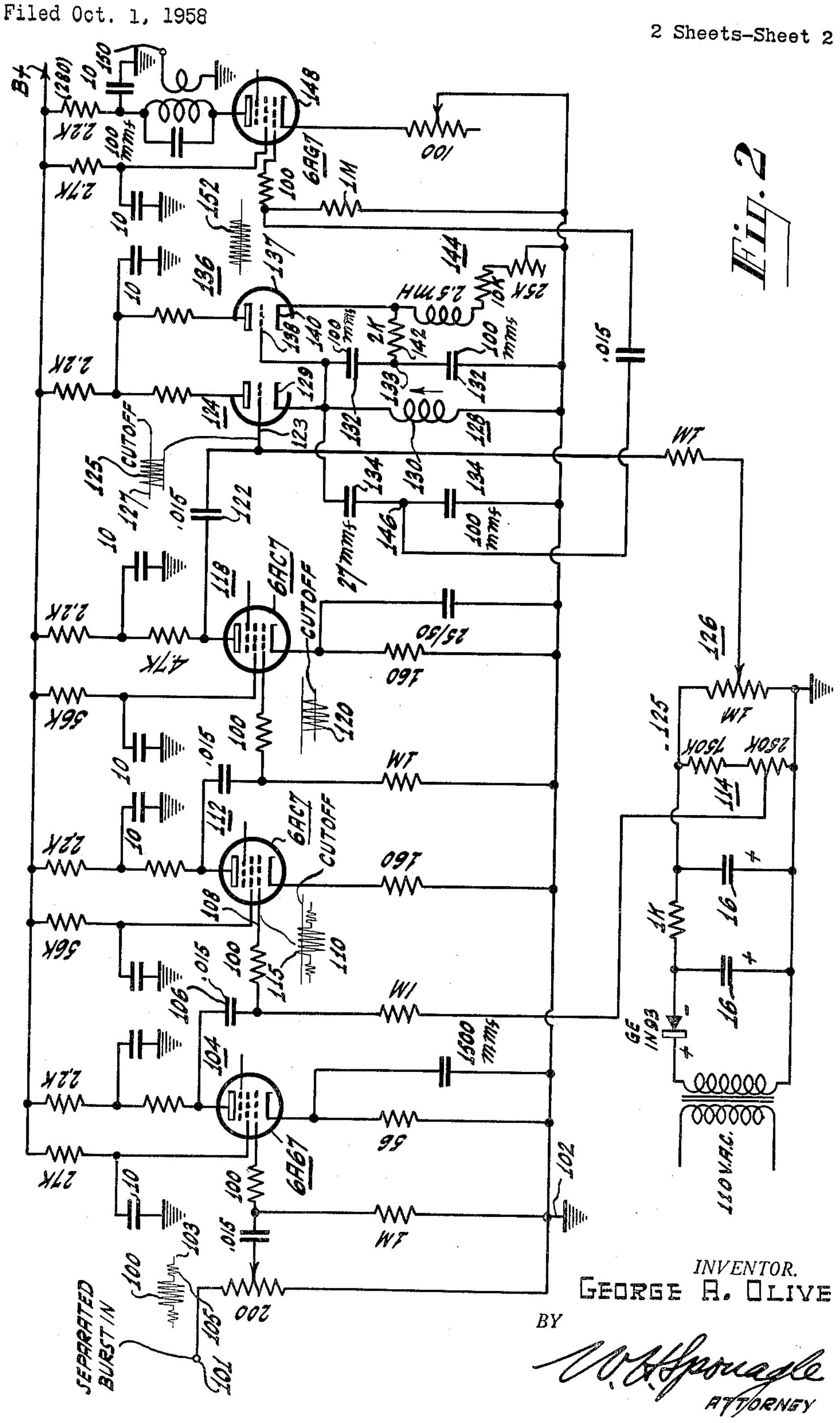
FIGURE 2 is an illustration of a resynchronizing type oscillator which may be employed in the system of FIGURE 1.

The start-stop oscillator 16 of FIGURE 1 is illustrated in detail in FIGURE 2. The start-stop oscillator of FIGURE 2 processes successive color reference bursts 100 from the recovered composite television signal and provides as an output a continuous reference signal having the same phase and frequency as each of the successive bursts 100. The color reference burst signal 100 is illustrated as eight cycles at a frequency of 3.57+ mcs., oscillating about an axis 103. Processing of the color reference signal 100 is required to eliminate any small gating or other transients 105 which may appear on either side of the color reference signal 100. During processing, all but the negative peaks of the separated color reference signal 100 are removed. These negative peaks are then amplified and clipped such that the remaining signal is free of all spurious information.

Describing this processing in detail, the color reference signal 100 is applied between an input terminal 101 and a point of reference potential such as ground 102 to the input of an amplifier 104. The output of the amplifier 104 provides an amplified color reference signal 110. The amplified color reference signal 110 passes through a coupling capacitor 106 to the input 108 of a first clipper 112. The input 108 of the first clipper 112 is biased by a negative source of voltage 114 to a cutoff level such that only the positive going peaks 115 of the amplified color reference signal 110 are of sufficient amplitude to cause conduction in the first clipper 112. The remainder of the amplified color reference signal 110 is clipped.

The output of the first clipper 112 thus provides a negative-going signal 120 from which the switching transients 105 that appeared in the original color reference signal 100 have been removed. The more negative portions of the negative-going signal 120 are then clipped by a second clipper 118 to eliminate any noise or other spurious information, which may have been originally attached to the peaks of the original color reference signal 100. The second clipper 118 is biased to become cut off by the more negative peaks of the waveform 120. The output of the second clipper 118 is the processed color reference signal which is illustrated by the waveform 125, and is coupled through a coupling capacitor 122 to the input 123 of a cathode follower gate 124. The input 123 of the cathode follower gate 124 is coupled to a second source of negative potential 126 of sufficient negative value such that the cathode follower gate 124 is normally in a cutoff or a non-conducting condition. This condition is illustrated by the cutoff level 127. The cathode follower gate 124 is gated on during each of the positive going peaks of the processed color reference signal 125 that are more positive than the cutoff bias level 127.

The cathode follower gate 124 includes a cathode 129 having as a cathode load, the tank circuit 128 of a Colpitts-type oscillator 136. The oscillator 136 includes a vacuum tube 137 having a control electrode 138 and a cathode electrode 140. The tank circuit 128 includes an inductor 130 connected in parallel with first pair of serially-connected capacitors 134 and a second pair of serially connected capacitors 132. The common point 133 between the second pair of capacitors 132 is coupled through a resistor 142 to the cathode 140 of the oscillator tube 137 and through a variable impedance 144 to ground 102. A second common point 146 between the first pair of capacitors 134 couples the output of the tank circuit 128 to the input of an output amplifier 148. The output of the output amplifier 148 is taken from an output terminal 150 with respect to ground 102.

The operation of the oscillator 136 is such that once its tank circuit 128 is excited to produce a sequence of oscillations, the feedback provided through the resistor 142 and capacitor 132 to the control electrode 138 of the oscillator tube 137, is of such a value that the oscillations in the tank circuit 128 are partially sustained. Such operation is attained by the proper adjustment of the variable impedance 144 to provide the necessary amount of feedback.

With the occurrence the positive peaks of each of the processed color reference burst frequency signals 125, the cathode follower 124 is gated on. When conducting, the cathode follower 124 presents a very low impedance across the tank circuit 128 (the tank circuit normally has a very high Q). Oscillations in the tank circuit 128 are thus damped with each positive peak of each cycle of the color reference burst frequency signal. Simultaneously, these positive peaks cause current to flow through the inductor 130 in the tank circuit 128 thereby initiating a new set of oscillations having the same phase and frequency as that of the processed color reference burst signal 125. After a succession of positive peaks from the color reference burst frequency 125, the oscillator 136 is allowed to continue its oscillation until the occurrence of the next succeeding reference color burst signal.

Thus, the start-stop oscillator provides an output oscillation 152 (pilot tone) having a variable time base; that is to say, the start-stop oscillator of FIGURE 2 provides a pilot tone which is substantially instantaneously (during the burst interval) variable in its phase to have the same phase to that of each preceding color reference burst. The parameters of the tank circuit 128 are selected to provide oscillations having nominally the same frequency as the color reference signals 100.

There has thus been described a relatively simple variable delay line system for removing time jitter, due to tape speed variations, from the signal obtained from a video tape recorder. The continuously variable delay line is one in which the delay from the video input to the video output is a continuous function of the voltage on its control input. The invention provides a means for sending a pilot tone through the delay line in the video band and a method of separating it at the output. In this manner, the pivot tone is subjected to the same variations as the video signal and thus provides a very accurate feedback means for controlling the delay afforded the video signal.

What is claimed is:

1. In apparatus for reproducing recorded signals from a recording medium including information signals and a reference signal, means to reduce the effects of timing variations of the recording medium, said means comprising a phase splitter coupled to receive said reproduced information signals to provide phase and paraphase information signals, a pair of adders responsive to the outputs of said phase splitter and to said reference signal for individually adding said reference signal to each of said phase and paraphase information signals, a pair of delay lines each being variable in delay characteristic in response to a control signal and each connected to receive the output of a different one of said adders, circuit means connected to receive the outputs of each of said delay lines to combine said delay line outputs in the proper sense to cancel said information signals and yield said reference signal, a source of a standard signal having nominally the same frequency as said reference signal, a phase detector connected to receive said standard signal and said reference signal from said information signal cancelling means to develop an error signal corresponding to the difference in time between said reference signal and said standard signal, and means for applying said error signal to said delay lines to vary the delay of each of said delay lines in such sense as to reduce said time difference.

2. Apparatus for reproducing recorded signals from a recording medium including information signals and a recurring reference signal recorded at constant frequency, including means for maintaining a constant time relationship between the reproduced reference signal and a standard signal of like frequency to reduce the effects of timing variations of the recording medium, said means comprising a phase splitter coupled to receive said reproduced information signals to provide phase and paraphase information signals, a pair of adders responsive to the outputs of said phase splitter and to said reference signal for individually adding said reproduced reference signal to each of said phase and paraphase information signals, a pair of delay lines each being variable in delay characteristic in response to a control signal and each connected to receive the output of a different one of said adders, circuit means connected to receive the outputs of each of said delay lines to combine said outputs in the proper sense to cancel said information signals and yield said reference signal, a phase detector connected to receive said standard signal and said reference signal from said information signal cancelling means to develop an error signal corresponding in sign and magnitude to the difference in time between said reference signal and said standard signal, and means for applying said error signal to said delay lines to vary the delay of each of said delay lines in such sense as to reduce said time difference.

3. The combination set forth in claim 2 which also includes circuit means connected to receive the outputs of each of said delay lines to combine said outputs in a proper sense to cancel said reference signals to thereby separate said information signals and said reference signal.

4. In apparatus for reproducing recorded signals from a recording medium including information signals and a recurring reference signal recorded at constant frequency, means for maintaining a constant time relationship between the reproduced reference signal and a standard signal of like frequency to eliminate the effects of timing variations of the recording medium, comprising a phase splitting means coupled to receive said reproduced information signals to provide phase and paraphase information signals, individual means to combine said reproduced reference signal with said phase and with said paraphase information signals, first and second means coupled to respective ones of said individual means to variably delay the combined reference and information signals in response to a control signal, circuit means connected to receive the outputs of each of said delay means to combine said outputs in the proper sense to cancel said information signals, a phase comparator connected to receive said standard signal and reference signals from said information signal cancelling means to develop a control signal corresponding to the difference in time between said reference signal and said standard signal, and means to apply said control signal to vary the delay of each of said delay means in such sense as to reduce said time difference.

5. The apparatus claimed in claim 4 which also includes circuit means connected to receive the outputs of each of said delay means to combine said outputs in the proper sense to cancel said reference signals.

6. In a system for reproducing signals including information components and cyclically recurring synchronizing components which have been recorded on a movable storage medium having a movement that is subject to variations, apparatus for compensating for the effect of said movement variations comprising, means responsive to said reproduced synchronizing components for deriving a continuous pilot tone signal bearing a fixed timing relation to said reproduced components, a first adder connected to add said pilot tone to said reproduced signals to produce a first sum signal, an inverter responsive to said reproduced signals to invert said reproduced signals, a second adder connected to receive said signal from said inverter and said pilot tone to produce a second sum signal, a pair of delay line means of the type in which the delay is varied in response to a control signal applied to said delay means, each said delay means being coupled to the output of a respective one of said first and second adders, a third adder coupled to the output of each of said delay lines operating to recover said pilot tone, a source of a standard signal having a frequency nominally the same as that of said pilot tone, a phase comparator connected to receive said standard signal and said pilot tone from said third adder to develop an error signal corresponding to the difference in time between said pilot tone and said standard signal, and means for applying said error signal to each of said delay lines to vary the delay thereof in such sense as to reduce said time difference and thus the effect of said motion variations of said movable storage medium.

7. In a system for reproducing signals including information components and cyclically recurring synchronizing components which have been recorded on a movable storage medium having a movement that is subject to variations, apparatus for compensating for the effect of said movement variations comprising, means responsive to said reproduced synchronizing components for generating a continuous pilot tone signal bearing a fixed phase relation to said reproduced synchronizing components, a first adder connected to add said pilot tone to said reproduced signals to produce a first sum signal, a phase inverter responsive to said reproduced signals to invert said reproduced signals, a second adder connected to receive the signal from said inverter and said pilot tone to produce a second sum signal, a pair of delay line means of the type in which the delay is varied in response to a control signal applied thereto, each said delay means being coupled to the output of a respective one of said first and second adders, a third adder coupled to the output of each of said delay means operating to recover said pilot tone, a phase comparator connected to receive a standard signal having a frequency nominally the same as that of said pilot tone and said pilot tone from said third adder to develop an error signal corresponding to the difference in time between said pilot tone and said standard signal, said error signal being representative of said motion variations of said movable storage medium, and means for applying said error signal to each of said delay means to vary the delay thereof in such sense as to reduce said time difference and thus the effect of said motion variations of said movable storage medium.

8. In apparatus for reproducing recorded signals from a storage medium including information signals and a cyclically recurring reference signal recorded at a constant frequency, means for maintaining a constant time relationship between the reproduced reference signal and a standard signal of like frequency to reduce the effects of timing variations of the storage medium, comprising a resynchronizing type oscillator connected to receive said reproduced reference signal for generating a continuous pilot tone having nominally the same frequency as said reference signal and being resynchronized to have the same phase as said reference signal with each occurrence thereof, a phase splitter coupled to receive said reproduced signals for providing phase and paraphase representations thereof, a first adder coupled to the phase output of said phase splitter and to said resynchronizing oscillator, a second adder coupled to the paraphase output of said phase splitter and to said resynchronizing oscillator, a first variable delay line being variable in delay characteristic and responsive to a control signal connected to the output of said first adder, a second delay line being variable in delay characteristic and responsive to a control signal connected to the output of the second adder, a third adder connected to the output of each of said first and second delay lines, a phase comparator connected to receive said standard signal and signals from the output of said third adder, the output of said phase detector being coupled to each of said first and second variable delay lines to vary the delay thereof, and a subtractor connected to the output of each of said first and second variable delay lines to provide said reproduced signals.

9. In a playback system for reproducing recorded color television signals from a recording medium, said color television signals including a color subcarrier synchronously modulated in phase and amplitude by a chrominance signal, a luminance signal, a color reference burst signal, and synchronizing signals, apparatus for variably delaying said reproducing signals to eliminate the effects of flutter of the recording medium, comprising means responsive to said reproduced burst signal to provide a continuous pilot tone having nominally the same frequency as said burst signal, first means to combine said pilot tone and said reproduced color television signals, first means to variably delay the output signal from said first combining means in accordance with a delay control signal, means to invert said reproduced color television signals to provide inverted color television signals, second means to combine said pilot tone and said inverted color television signals, second means to variably delay the output signal of said second combining means in accordance with a delay control signal, third means to combine the signals from each of said first and second delay means in such sense as to cancel said color television signals and thereby recover said pilot tone, a source of a stable standard signal having the same frequency as said reproduced color subcarrier, means to compare the phase of said standard signal with the phase of the delayed pilot tone from said third combining means and to develop an error signal corresponding to the difference in time between said standard signal and said pilot tone, and means for applying said error signal as a control signal to vary the delay of said delay means in such sense as to reduce said time difference.

10. In a playback system for reproducing recorded standard color television signals from a recording medium, said recorded signals including a color subcarrier synchronously modulated in phase and amplitude by a chrominance signal, a luminance signal, a color reference burst signal, and synchronizing signals, apparatus for variably delaying said reproduced signals to eliminate the effects of motion variations in the recording medium, comprising means responsive to said reproduced burst signal to provide a continuous pilot tone that is resynchronized in both phase and frequency by each said reproduced color reference burst signal, first means to add said pilot tone and said reproduced color television signals, first means to variably delay the output signal of said first adding means in accordance with a delay control signal, means to invert said reproduced color television signals to provide inverted color television signals, second means to add said pilot and said inverted color television signals, second means to variably delay the output signals of said second adding means in accordance with a delay control signal, means to add the signals from each of said first and second delay means to thereby recover the delayed pilot tones, a source of a stable standard signal having the same frequency as said reproduced color subcarrier, means to compare the phase of said standard signal from said source with the phase of the delayed pilot tone from said last-mentioned adding means to develop an error signal corresponding to the difference in time between said standard signal from said source and the delayed pilot tones, means for applying said error signal as a control signal to vary the delay of said delay means in such sense as to reduce said time difference, and means to subtract the signals from each of said first and second delay means to thereby recover said reproduced color television signals substantially free of the effects of said motion variations.

11. In a playback system for reproducing recorded color television signals from a recording medium, said recorded signals including a color subcarrier synchronously modulated in phase and amplitude by a chrominance signal, a luminance signal, a color reference burst signal, and synchronizing signals, apparatus for variably delaying said reproduced signals to eliminate the effects of motion variations of the recording medium, comprising a burst gate for deriving said color reference brust signal from said reproduced signals, a resynchronizing generator responsive to the color reference burst signals from said burst gate to provide a continuous pilot tone having the same phase as said burst signals, a phase splitter connected to receive said reproduced color signals to provide phase and paraphase representations thereof, a first adder connected to add the phase output of said phase splitter and said pilot tone, a variable delay line connected to receive the output of said first adder and variable in delay characteristic and responsive to a control signal, a second adder connected to add the paraphase output of said phase splitter and said pilot tone, a second delay line connected to receive the output of said second adder and variable in delay characteristic in response to a control signal, a third adder connected to add the signals from each of said delay lines to thereby cancel said phase and paraphase representations of said reproduced color television signals leaving said pilot tone, a source of a standard signal having the same nominal frequency of said color subcarrier, a phase comparator connected to receive said standard signal and the delayed pilot tone from said third adder to develop an error signal corresponding to the difference in time between said standard signal and said pilot tone, and means for applying said error signal as a control signal to vary the delay of each of said delay lines in such sense as to reduce said time difference to thereby reduce the effects of said motion variations of the recording medium.

12. In a playback system for reproducing recorded color television signals from a recording medium, said recorded signals including a color subcarrier synchronously modulated in phase and amplitude by a chrominance signal, a luminance signal, a color reference burst signal, and synchronizing signals, apparatus for variably delaying said reproduced signals to eliminate the effects of motion variations of the recording medium, comprising a burst gate for deriving said color reference burst signal from said reproduced signals, a resynchronizing oscillator responsive to the color reference burst signals from said burst gate to provide a continuous pilot tone having the same phase as said burst signals, a phase splitter connected to receive said reproduced color signals to provide phase and paraphase representations thereof, a first adder connected to add the phase output of said phase splitter and said pilot tone, a variable delay line connected to receive the output of said first adder and variable in delay characteristic and responsive to a control signal, a second adder connected to add the paraphase output of said phase splitter and said pilot tone, a second delay line connected to receive the output of said second adder and variable in delay characteristic in response to a control signal, a third adder connected to add the signals from each of said delay lines to thereby cancel said phase and paraphase representations of said reproduced color television signals leaving said pilot tone, a source of a standard signal having the same nominal frequency as said color subcarrier, a phase comparator connected to receive said standard signal and the delayed pilot tone from said third adder to develop an error signal corresponding to the difference in time between said standard signal and said pilot tone, means for applying said error signal as a control signal to vary the delay of each of said delay lines in such sense as to reduce said time difference and to thereby reduce the effects of motion variations of said recording medium, a subtractor connected to receive the output of each of said delay lines whereby the pilot tones cancel each other and leave the desired reproduced color television signals now substantially free of the effects of said motion variations in said recording medium.

No references cited.